United States Patent

[11] 3,612,436

| [72] | Inventors | Henry G. Shakespeare;<br>Gerald Dale Harrington, both of<br>Kalamazoo, Mich. |
|---|---|---|
| [21] | Appl. No. | 835,639 |
| [22] | Filed | June 23, 1969 |
| [45] | Patented | Oct. 12, 1971 |
| [73] | Assignee | Shakespeare of Arkansas, Inc.<br>Fayetteville, Ark. |

[54] FREE SPOOL MECHANISM
10 Claims, 11 Drawing Figs.

[52] U.S. Cl. .................................................. 242/216,
242/220
[51] Int. Cl. ........................................................ A01k 89/02
[50] Field of Search ........................................... 242/84.54,
84.44, 84.45, 84.46, 84.51, 84.42

[56] References Cited
UNITED STATES PATENTS

| 869,474 | 10/1907 | Atwood | 242/84.45 |
| 1,730,332 | 10/1929 | Pflueger | 242/84.51 |
| 1,939,148 | 12/1933 | Spenny | 242/84.54 |
| 2,380,670 | 7/1945 | Nelson | 242/84.42 |
| 2,547,330 | 4/1951 | Lauterbach | 242/84.54 |
| 3,104,850 | 9/1963 | Wood, Jr. | 242/84.54 X |
| 3,489,366 | 1/1970 | Rankin | 242/84.54 |

*Primary Examiner*—Billy S. Taylor
*Attorney*—Hamilton, Cook, Renner & Kenner

ABSTRACT: A free spool mechanism for a fishing reel. The free spool mechanism employs a clutch by which a driving connection between two rotatable members in the drive train operatively joining the crank and line spool can be selectively disengaged and automatically reengaged upon rotation of the crank. The clutch has opposed, interfitting clutch elements, one mounted to rotate with one member of the drive train and the opposed clutch element mounted to rotate with another member of the drive train. A throwout means is selectively operative to separate said clutch elements for disengaging the driving connection therebetween. The throwout means also maintains the clutch elements separated until a trip means operates in response to rotation of the crank to reengage the driving connection between the clutch elements. The trip means may be provided with a finger mounted for resilient movement through a predetermined range. Because of the resilient mounting, even interaction of the finger with the throwout means while the throwout means is being actuated to separate the clutch elements does not block the clutch elements in engaged position and/or result in untimely reengagement of the clutch elements. This desirable result obtains irrespective of whether or not the reel is provided with an antireverse mechanism. Nevertheless, predetermination of the range through which the finger is yieldingly movable assures reengagement of the clutch elements, when desired.

PATENTED OCT 12 1971

INVENTORS
HENRY G. SHAKESPEARE
GERALD DALE HARRINGTON
BY Hamilton, Cook,
Rennert Kenner
ATTORNEYS

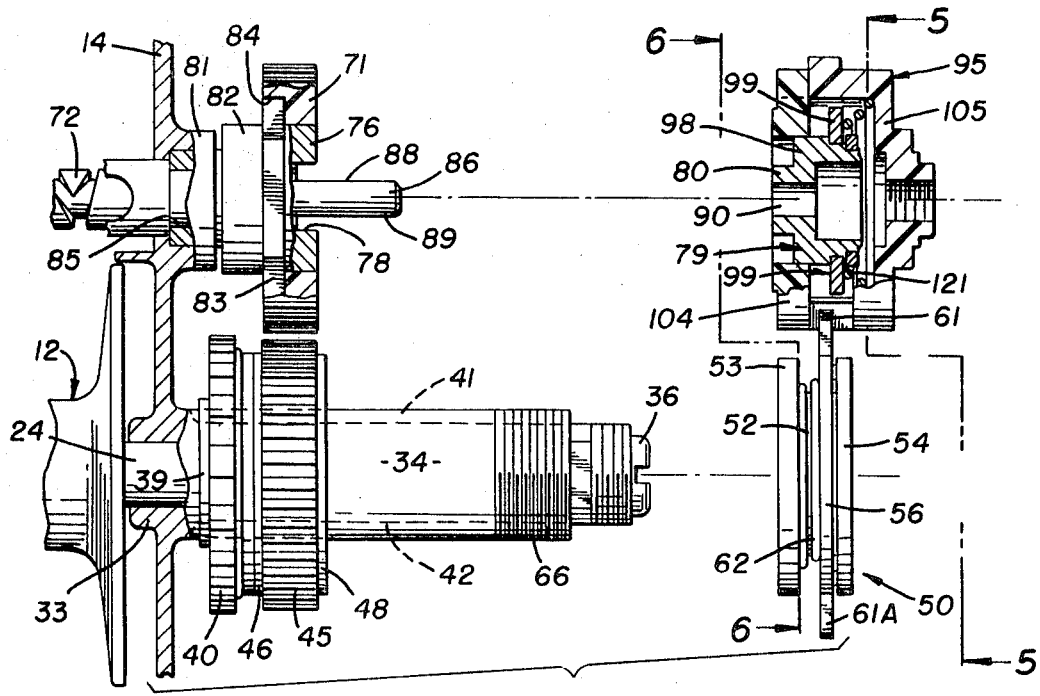
FIG. 4
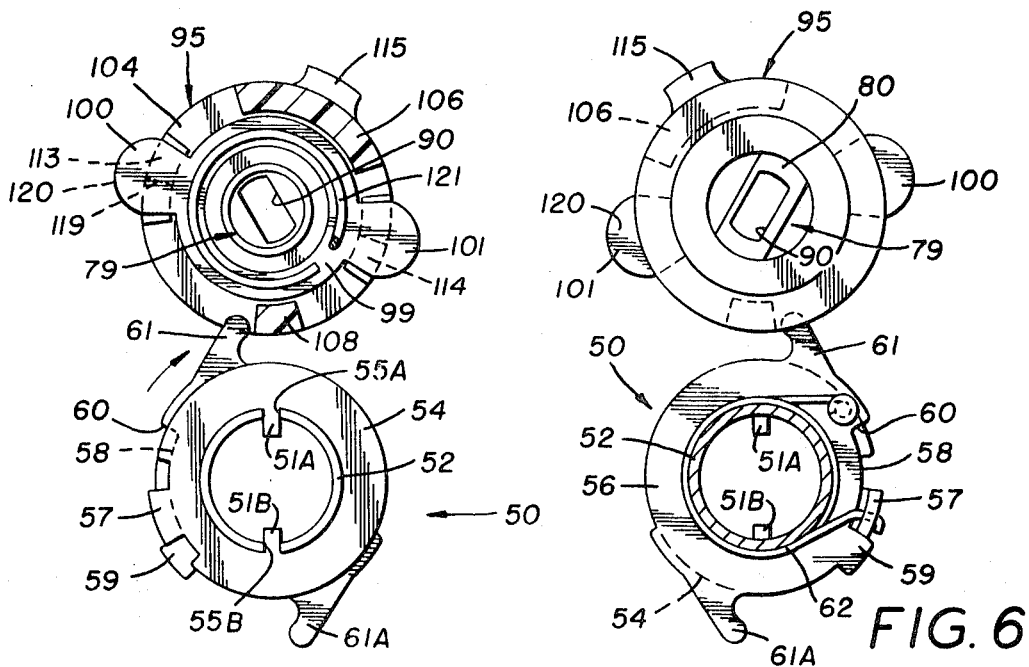
FIG. 5
FIG. 6
INVENTORS
HENRY G. SHAKESPEARE
GERALD DALE HARRINGTON
BY Hamilton, Cook
Rennert Kenner
ATTORNEYS

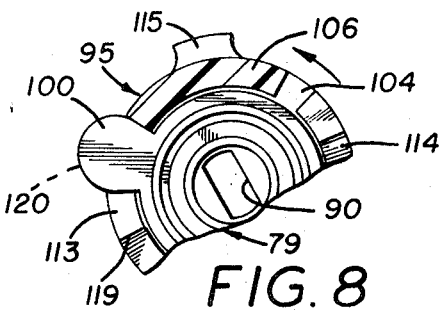
FIG. 8
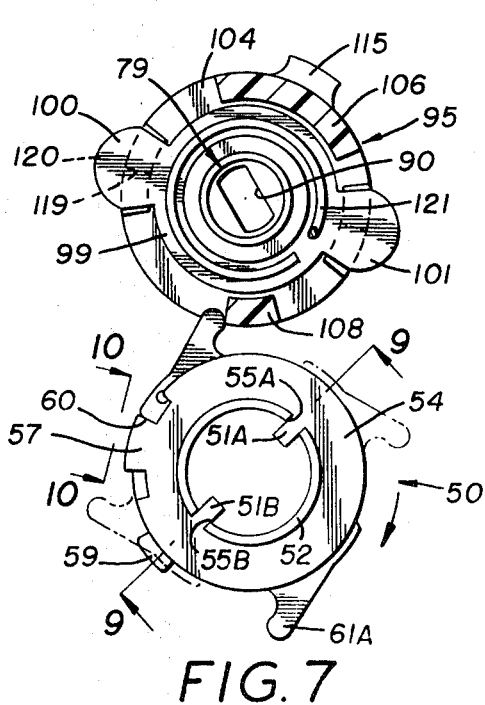
FIG. 7
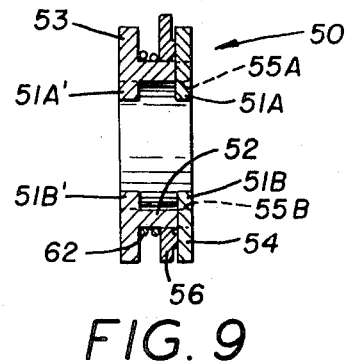
FIG. 9
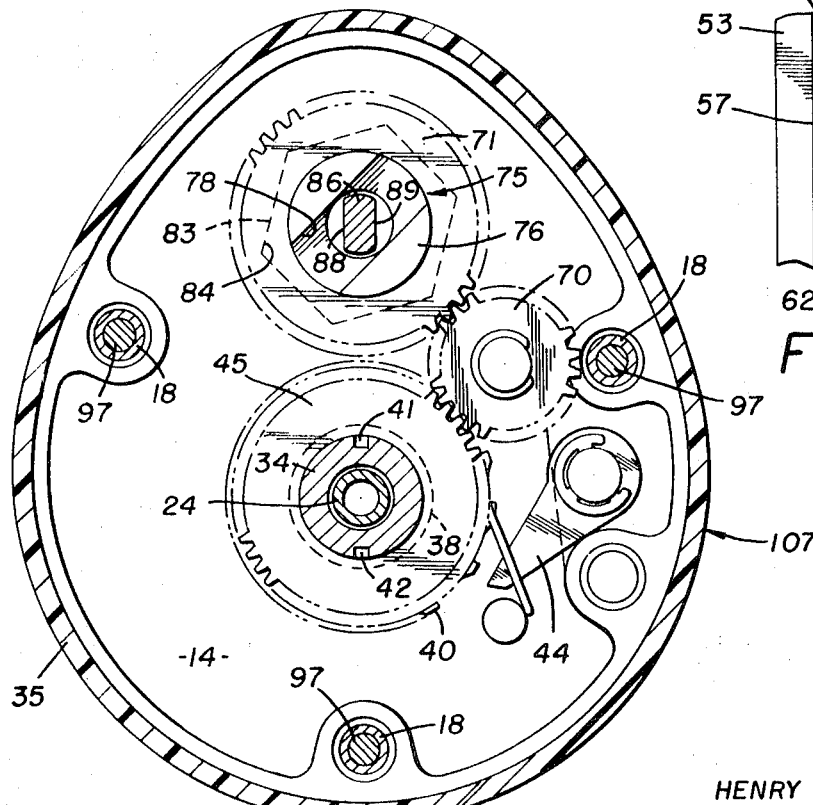
FIG. 10
FIG. 11
INVENTORS
HENRY G. SHAKESPEARE
GERALD DALE HARRINGTON
BY Hamilton, Cook,
Renner & Renner
ATTORNEYS

FREE SPOOL MECHANISM

BACKGROUND OF THE INVENTION

The present invention relates to a free spool mechanism.

It was recognized at a very early stage in the development of bait-casting reels, and particularly multiplying reels, that there were many advantages to be obtained by permitting the spool to rotate independently with respect both to the crank and to as much of the gear train between the crank and reel as possible. Absent this free spooling, the intertooth friction between meshing gear teeth in a complex drive train will itself tend to retard rotation of the line spool during the cast, and this undesirable effect is often augmented by the improper application of heavy grease to the gear teeth. But an even greater hindrance to the achievement of controlled rotation by the line spool during a cast is the result of inertia—both static and dynamic.

The principle of bait casting is that the lure, the motion of which is imparted by the action of the rod, pulls the line from the reel, causing the spool on which the line is wound to revolve. The spool must start to revolve suddenly from a dead stop at the beginning of the cast, must pay out line in ratio to the pull of the lure as it travels through the air and must be made to cease revolving as soon as the lure reaches its destination. As such, the greater the mass which must be put into motion by the cast, the greater the resistance that is offered against the flight of the lure. Similarly, once this mass is put into motion, the more difficult it is to slow the movement thereof with the flight of the lure at the end of the cast. The use of a free-spooling mechanism permits reduction of the mass that must be put in motion and then stopped.

Historically, free-spooling arrangements required manual actuation of means to disengage the spool from the drive train prior the cast and then additional manual actuation upon completion of the cast to reengage the spool with the drive train before rotating the crank. As the free-spooling concept was further developed, various mechanisms were devised for automatically reengaging the spool with the drive train by the initial movement of the crank to retrieve the line.

Concurrently with the development of free-spooling mechanisms for bait-casting reels, level wind mechanisms were being evolved. While not of absolute necessity, level wind mechanisms preclude the absolute nuisance of guiding the line evenly onto the spool with the forefinger and thumb while looking somewhere else. To guide the line evenly onto the spool, level wind mechanisms reciprocate across the length of the spool, and in proximity thereto, in response to rotation of the spool during the retrieve. Because of its proximity to the spool, the level wind should reversely reciprocate in conformity with the lay of the line wound thereon in response to rotation of the spool during the cast so that the exiting line will not be unduly impeded by the level wind.

As such, most prior known free spool mechanisms require gearing in addition to that required to connect the crank operatively to the line spool to operate the level wind when the line spool is freed to rotate independently of the crank.

SUMMARY OF THE INVENTION

It is, therefore, a primary object of the present invention to provide a novel free-spooling mechanism having a clutch means that is automatically reengaged by the initial retrieving movement of the crank.

It is another object of the present invention to provide a novel free-spooling mechanism, as above, which is readily adaptable to spools utilizing a common drive train to operate the level wind and rotate the spool for retrieving line.

It is a further object of the present invention to provide a novel free spool mechanism, as above, in which the means for automatically reengaging the clutch means will not block manual disengagement thereof or result in untimely reengagement of the clutch elements.

These and other objects, together with the advantages thereof over existing and prior art forms, which will become apparent from the following specification are accomplished by means hereinafter described and claimed.

In general, a free spool mechanism embodying the concept of the present invention employs a clutch means selectively to disengage and reengage two of the rotating members in the reel drive train, the drive train comprising a crank, a line spool and the motion-transmitting means interconnecting the crank and line spool. The clutch means comprises first and second clutch elements. The first clutch element is rotatable with one of the rotating members of the drive train, and the second clutch element is rotatable with another of the rotating members. Yet, the two clutch elements are relatively movable to effect engagement and disengagement therebetween.

A throwout means effects relative movement of the two clutch elements to disengage them and occasion free spooling. And, a trip means, movable in response to rotation of the crank, effects reengagement of the clutch elements to establish the driving connection therebetween necessary to revolve the spool in response to rotation of the crank. A yielding means incorporated in the trip means precludes it from blocking disengagement of the clutch elements or effecting untimely reengagement thereof, even with a reel employing an antireverse mechanism.

One preferred embodiment is shown by way of example in the accompanying drawings and described in detail without attempting to show all of the various forms and modifications in which the invention might be embodied; the invention being measured by the appended claims and not by the details of the specification.

DESCRIPTION OF THE DRAWINGS

FIG. 4 is an enlarged, exploded view, partially in section, of the free spool mechanism and the most closely related members of the spool drive train and depicting the throwout means actuated to have disengaged the clutch elements for free spooling;

FIG. 5 is a view taken substantially on line 5—5 of FIG. 4 depicting the cage in section of the trip means in elevation;

FIG. 6 is a view taken substantially on line 6—6 of FIG. 4 depicting the cage in end elevation and the trip means in section;

FIG. 7 is a view similar to FIG. 5 depicting, in solid line, the finger on the trip means having engaged catch means on the cage and having been yieldingly moved to the limit of its retrorotational range and, in phantom, the continued movement of the finger with the trip means after having actuated the throwout means to reengage the clutch elements;

FIG. 8 is a partial area of FIG. 7 depicting the cage in the orientation resulting by movement of the finger from the solid line to the phantom representation in FIG. 7;

FIG. 9 is a cross section through the trip means taken substantially on line 9—9 of FIG. 7;

FIG. 10 is a profile elevation of a portion of the trip means taken substantially on line 10—10 of FIG. 7; and, FIG. 11 is a vertical section taken substantially on line 11—11 of FIG. 2.

DESCRIPTION OF THE PREFERRED EMBODIMENT

Figure 1:
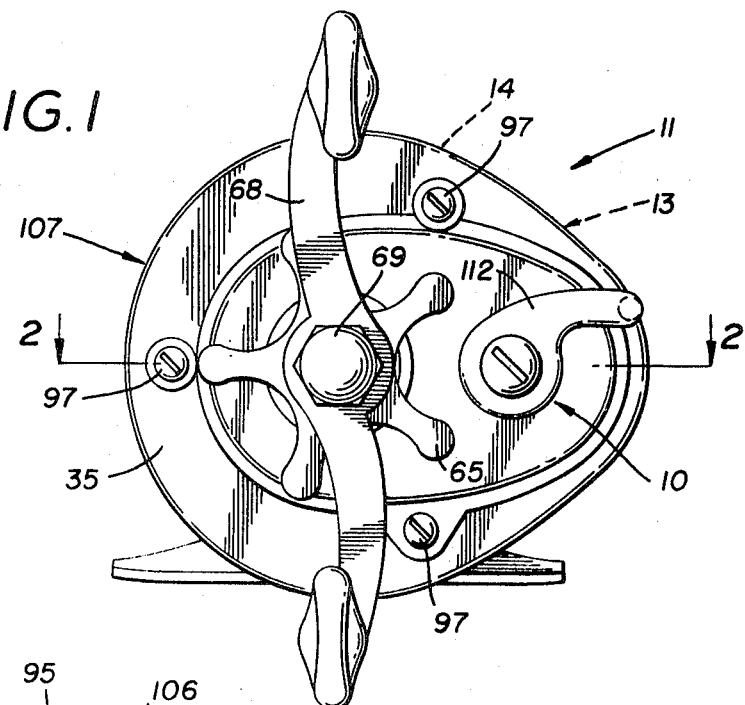
FIG. 1 is a side elevation of a bait-casting reel incorporating a free spool mechanism embodying the concept of the present invention.

Referring more particularly to the drawings, a free spool mechanism embodying the concept of the present invention is indicated generally by the numeral 10 and is incorporated in a reel 11 of the bait-casting variety. The details of reel 11 are more fully disclosed in our copending application, Ser. No. 835,382, filed June 23, 1969, but briefly to facilitate the disclosure herein, the reel 11 has a line spool 12 rotatably mounted in a frame 13, the frame 13 comprising a head plate 14 rigidly joined to the tail plate 15 of a tail plate assembly 16 by a plurality of pillars 18. In the reel 10 disclosed, the tail assembly 16 presents a rigid spider 19 the legs 20 of which are anchored to the tail plate 15. The nave 21 of the spider 19 has a bore 22 tapped to receive the threaded end 23 of an arbor 24 supported between headplate 14 and the spider 19. The line spool 12 is mounted on the arbor 24 for rotation with respect thereto by a pair of sleeve bearings 25 and 26 secured within the hub 28 of the line spool 12.

A pair of axially spaced peripheral grooves 29 and 30 on the arbor 24 each receive a substantially circular, spring retaining clip 31 and an annular, low friction thrust washer 32 juxtaposed to the sleeve bearings 25 and 26 whereby to maintain the line spool 12 in a fixed axial position with respect to the arbor 24. The axial position of the line 12 with respect to the frame 13 may be adjusted by selective rotation of the arbor with respect to spider 19.

The arbor 24 also extends through and beyond a boss 33 in the headplate 14 in a direction oppositely the tail assembly 16 and rotatably supports a hollow drive shaft 34 that extends through the removably mounted head cover cap 35. The drive shaft 34 is retained on the arbor 24 by a capscrew 36 tightened into the axially outer end of the arbor 24.

Figure 2:
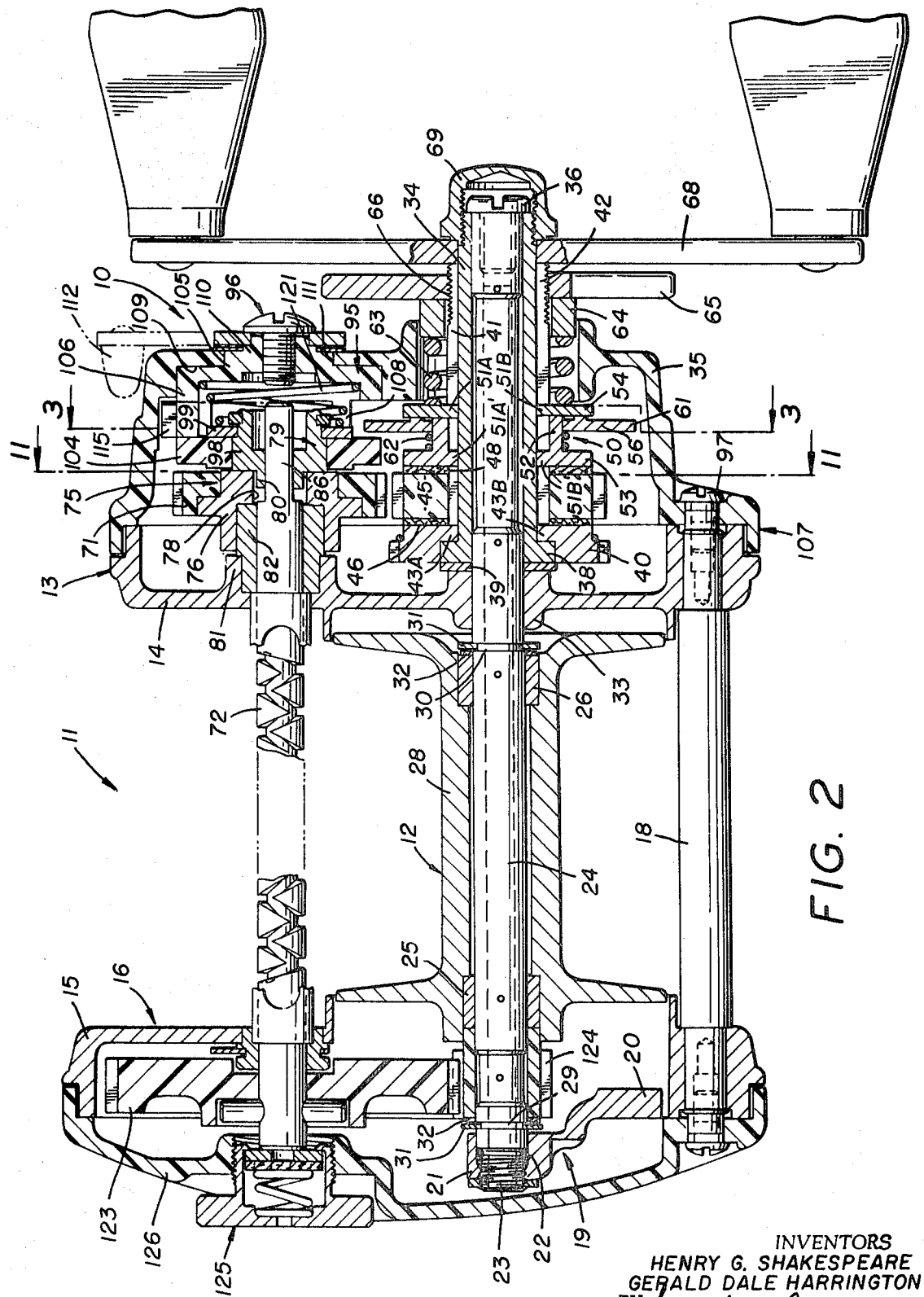
FIG. 2 is an enlarged horizontal cross section taken substantially on line 2—2 of FIG. 1 and depicting the elements of the clutch means interengaged for a driving connection therethrough.

A radial flange 38 at the axially inner end of the drive shaft 34 engages a thrust washer 39 mounted on arbor 24 and interposed between the flange 38 and the axially outer face of boss 33. The flange 38 provides a stop against which an antireverse ratchet wheel 40 abuts. The ratchet wheel 40 is carried on the drive shaft 34 to be nonrotatable with respect thereto. As best seen in FIGS. 2 and 11, a pair of diametrically opposed ways 41 and 42 extend axially of the drive shaft 34. A pair of opposed keys 43A and 43B on the ratchet wheel 40 interfit with the ways 41 and 42, and a pawl 44 pivotally mounted on the headplate 14 interacts with the ratchet wheel 40 to prevent the drive shaft 34 from reversely rotating. This antireverse mechanism may be continuously operative, as shown, or it may be selective. In either event it delineates the direction in which the drive shaft 34 may rotate.

An input drive gear 45 is rotatably, and axially slidably, supported on the drive shaft 34 between two friction washers 46 and 48 in order to effect selective drag, as is more fully explained in our aforesaid copending application, Ser. No. 835,382.

Continuing axially outwardly along the drive shaft 34, a trip means, indicated generally by the numeral 50, is provided with opposed keys 51A and 51B which also interfit with ways 41 and 42 so as to be slidable axially along, and be nonrotatable with respect to, the drive shaft 34. The keys 51A and 51B extend radially inwardly with respect to the barrel portion 52 of the trip means 50. A foot flange 53 extends radially outwardly from one end of the barrel portion 52, and a disclike limit plate 54 is secured to the opposite end of the barrel portion 52. As shown in FIGS. 5 and 9, the pair of opposed keys 51A and 51B that extend radially inwardly from the limit plate 54 are received through corresponding notches 55A and 55B in the barrel portion 52 to fix the position of the limit plate 54 with respect to the barrel portion 52. If desired a second pair of such keys 51A' and 51B' may also extend radially inwardly from the barrel portion 52 in opposition to the foot flange 53.

A trip plate 56 is mounted on the radially outer surface of the barrel portion 52 to be rotatable through a predetermined range. A limit flange 57 (FIGS. 5, 6 and 10) projects axially from the periphery of the limit plate 54 and extends across a relieved portion 58 (FIG. 6) in the perimeter of the trip plate.

A stop lug 59 at one end of the relieved portion 58 and a shoulder 60 on the rear of a trip finger 61 at the opposite end of the relieved portion 58 delineate, by engagement with the limit flange 57, the range through which the trip plate can be rotated. In the preferred embodiment depicted this range is on the order of 35°.

A spring 62 connects between the trip plate 56 and the limit flange 57 to bias the stop lug 59 against the limit flange 57 for a purpose that will hereinafter be more fully explained.

Returning now to FIG. 2, one end of a compression spring 63 that encircles the hollow drive shaft 34 engages the trip means 50 and the opposite end is engaged by an annular gland 64 that is movable axially against the spring 63 by a star wheel 65 received on a threaded portion 66 of the drive shaft 34.

Axially outwardly of the threaded portion 66, the drive shaft 34 is adapted to mount a crank 68 in a customary fashion so that rotation thereof will rotate the drive shaft 34. An end cap 69 may be provided to secure the crank 68 to the drive shaft 34 and provide a decorative appearance.

As is more fully described in our aforesaid copending application, Ser. No. 835,382, positioning of the star wheel 65 will adjust the drag so that the drive gear 45 will normally rotate with the drive shaft 34.

Reverting again to FIG. 11, the drive gear 45 meshes with an idler gear 70, and that, in turn, meshes with the clutch gear 71. An idler gear 70 is used to coordinate the direction in which the line spool 12 revolves in response to the direction in which the crank 68 is rotated. It may, therefore, be positioned at any point within the drive train. Selection of its location may be determined by convenience, by space requirements, by the gearing necessary to provide the desired retrieve ratio and/or by the number of gear members one is willing to have rotate during free spooling.

The clutch gear 71 is connected to the traversing shaft 72 of a level wind mechanism, not shown, by clutch means 75 in the free spool mechanism 10. As best seen in FIGS. 2 and 4, two of the relatively rotatable members of the drive train—the clutch gear 71 and the traversing shaft 72—are interconnected by first and second elements of the clutch means 75. The one clutch element 76 forms the hub of the clutch gear 71 and presents a slot 78 in the face thereof. The second clutch element 79 comprises a dog 80 secured to be rotatable with the traversing shaft 72. When the two clutch elements 76 and 79 are matingly interfitted, a driving connection obtains therebetween. However, at least one of the clutch elements is movable axially of the other to interrupt the driving connection therebetween for provision of the desired free spool effect.

In the preferred embodiment depicted herein, a boss 81 extends outwardly of the headplate 14 and receives a mushroom journal 82 on which clutch element 76 is rotatably received. When, as shown, the clutch element 76 is formed separately of the clutch gear 71, an interdrive, such as the hexagonal flange 83 (FIG. 11) on the clutching element 76, is embraced by a matingly bounded recess 84 in the clutch gear 71 to assure that the gear 71 and clutching element 76 will always rotate with each other.

A bore 85 extends through the mushroom journal 82 rotatably to receive the traversing shaft 72. A portion 86 of the traversing shaft 72 extends through and beyond the clutching element 76 and is rotatable with respect thereto. The clutching element 79 is carried on that portion 86 of the traversing shaft 72 that extends axially beyond the mushroom journal 82 and clutching element 76, the clutching element 79 being so mounted as to rotate only with the traversing shaft 72 and yet be slidable axially therealong. As shown, portion 86 of the traversing shaft 72 may be provided with opposed flats 88 and 89 and may be received within a conforming aperture 90 through the clutching element 79 to effect mutual rotational movement and permit relative axial movement.

Figure 3:
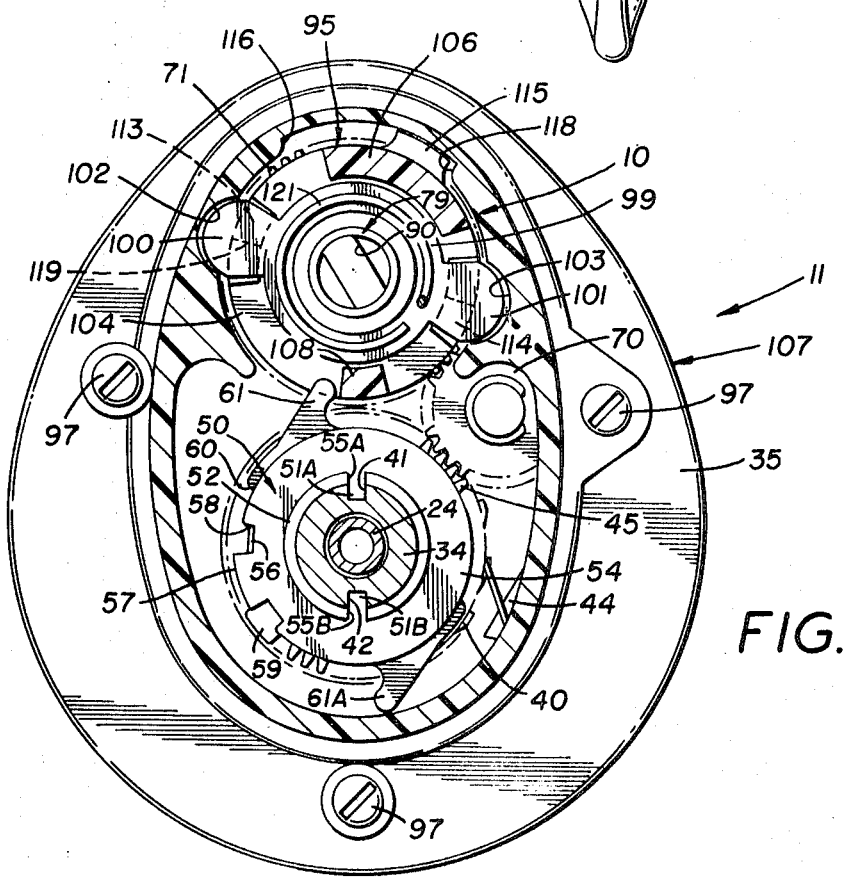
FIG. 3 is a vertical section taken substantially on line 3—3 of FIG. 2 and depicting the cage of the preferred throwout means in section, whereby the yoke and drum portion of one element of the clutch means—interconnect two rotatable members of the reel drive train—is viewed in end elevation, and depicting the trip means—mounted to rotate in response to rotation of the crank—also in end elevation, the clutch means, throwout means and trip means comprising the free spool mechanism.

A throwout means in the form of a cage 95 and means 96 (FIG. 2) to actuate the throwout cage 95 accomplish the axial separation of the clutch elements 76 and 79 necessary to permit free spooling. In the particular embodiment disclosed, dog 80 is presented at one end of a drum portion 98, and the drum portion 98 is rotatably supported on a yoke 99 (FIGS. 5 and 7). A pair of positioning wings 100 and 101 extend outwardly of the yoke 99 and are received in confining recesses 102 and 103, respectively, in the head cover cap 35, as shown in FIG. 3, to preclude the yoke 99 from rotation and yet permit the yoke 99 and clutch element 79 to translate with respect to clutch element 76. Because the cover cap 35 must thus function to preclude rotational movement of the positioning wings 100 and 101 with respect to the reel frame 13, the cover cap 35 is secured, preferably demountably, as by screws 97, to the reel frame 13 and becomes, in combination with the frame 13, a component of the reel housing 107. The drum portion 98 of the clutching element 79 is rotatably received through a cam plate 104 in the throwout cage 95. As best seen in FIG. 4, the cam plate 104 forms one end of the throwout cage 95 and is maintained in spaced relation from a bearing disc 105 that forms the other end of the throwout cage 95 by a bridging wall portion 106 and a postlike catching means 108 particularly located for a purpose to be hereinafter more fully explained.

The positioning wings 100 and 101 extend radially outwardly of the throwout cage 95, between the cam plate 104 and bearing disc 105, to engage the head cover cap 35.

A way 109 (FIG. 2) is provided in the head cover cap 35 in which rotatably to receive the bearing disc 105, and a post 110 extends from the face of the bearing disc 105 outwardly through an opening 111 in the cover cap 35. A lever 112 may be secured to the post 110 exteriorly of the cover cap 35 to complete the actuating means 96. Rotation of lever 112 will effect rotation of the throwout cage 95, and, because the positioning wings 100 and 101 are fixed with respect to the cover cap 35, the throwout cage 95 will rotate with respect to the yoke 99. Thus, when the throwout cage 95 rotates with respect to the yoke 99 axially directed camming surfaces 113 and 114 on the cam plate 104 will interact with the yoke 99. As the throwout cage 95 rotates to move the camming surfaces 113 and 114 toward and against the yoke 99, the dog 80 on the clutch element 79 is moved axially out of driving engagement with the slot 78 on the other clutch element 76.

A lug 115 may extend radially of the throwout cage 95, as from the bridging wall portion 106, and be movable between opposed shoulder stops 116 and 118 presented from the cover cap 35 to delineate the range through which the throwout cage 95 may be rotated by lever 112.

As best seen in FIGS. 3, 5 and 7, the camming surface 113, and surface 114 may be identical therewith, terminates in an apex 119 which, when the throwout cage 95 has been rotated to separate the clutch elements 76 and 79, will be supportingly positioned against the face 120 of the positioning wing 100 to maintain the clutch element 79 axially separated from clutch element 76, even against the biasing action of a compression spring 121 interposed between the yoke 99 and the bearing disc 105 within the throwout cage 95.

As noted above, the traversing shaft 72 is journaled between the head and tail plates 14 and 15, respectively, for operation of a level wind, not shown. Within the tail assembly 16 the traversing shaft 72 is secured to a transfer gear 123 that continuously meshes with a pinion gear 124 affixed to the line spool 12. In this way, rotation of the line spool 12 will always be accompanied by a corresponding rotation of the traversing shaft 72, and thus a level wind, if provided thereon.

In addition, the continuous interconnection between the line spool 12 and the traversing shaft 72 also permits incorporation of the truly functional antibacklash mechanism 125, mounted in the tail cover cap 126, for operative interaction with the traversing shaft 72, as is more fully explained in our aforesaid copending application, Ser. No. 835,382.

OPERATION

When retrieving line, the clutch elements 76 and 79 are maintained in driving connection, as represented in FIG. 2, by the biasing action of the compression spring 121. As such, rotation of the crank 68 effects, within the frictional drive range established by engagement of the drag discs 46 and 48 with drive gear 45, concomitant rotation of drive gear 45, idler gear 70, clutch gear 71, traversing shaft 72, transfer gear 123, pinion gear 124 and line spool 12, i.e., the drive train.

To provide a free spool for casting, the fisherman rotates the lever 112 about the axis of post 110 within the range limited by movement of lug 115 from shoulder stop 116 to shoulder stop 118. The resulting rotation of the throwout cage 95 through this range brings the camming surfaces 113 and 114 against the positioning wings 100 and 101 of yoke 99 to translate the dog 80 on clutch element 79 axially out of slot 78 in clutch element 76 and positions the apex of each camming surface 113 and 114 beneath its respective positioning wing 100 and 101, as represented in FIGS. 4, 5 and 7.

By thus retaining the clutch elements 76 and 79 disengaged, the line spool 12 can rotate independently of the crank 68 and free spooling is thereby effected for the cast.

It must be appreciated that the subject clutch means 75 may be incorporated at any point within the drive train and still effect free spooling. However, the preferred location permits the traversing shaft 72 to rotate in response to rotation of the spool 12, in order to minimize frictional resistance to the exiting line should a level wind mechanism be employed in conjunction with shaft 72.

To reengage the clutch elements 76 and 79, the fisherman need only operate the crank 68. Rotation of the crank, and thus the drive shaft 34, also rotates the trip means 50 nonrotatably secured to the shaft 34. As the trip means 50 is rotated, trip finger 61, or trip finger 61A if more than one is provided, will, at some point, engage the catch post 108 and retrorotate the throwout cage 95 with respect to the yoke 99. As the cage 95 is retrorotated, the camming surfaces 113 and 114 move out of engagement with the positioning wings 101 and 101 so that the spring 121 can bias the clutch element 79 toward clutch element 76. So biased, the dog 80 will drivingly reengage with the slot 78 at some point during rotation of the clutch gear 71 with respect to the traversing shaft 72 so that the line spool 12 will rotate in response to rotation of crank 68.

It must be appreciated that the trip finger 61 is preferably connected to the crank 68 by a yielding means such as spring 62 to assure that free spooling can be effected by the actuation means 96 irrespective of the angular location of the crank 68 and pickup fingers 61 or 61A. Because the antireverse ratchet 40 and pawl 44 will prevent the trip means 50 from reversely rotating should the catch post 108 engage the trip finger 61 when the fisherman swings lever 112 to effect a free spool, the trip finger 61 must be yieldingly mounted. Spring 62 effects this result.

The spring 62 must neither apply sufficient torsional force to restrict the rotation of cage 95 necessary to effect free spooling in response to movement of level 112 nor must it apply sufficient torsional force to retrorotate the cage 95 after the fisherman removes his hand from lever 112.

With the strength of the spring 62 being necessarily so limited, engagement of the stop lug 59 with the limit flange 57, as shown in FIG. 7, effects the angular force transfer from the crank 68 and drive shaft 34, through the trip finger 61 and against the catch post 108 to rotate the throwout cage 95, to the position represented in FIG. 8, for automatically reengaging the clutch elements 76 and 79 in response to rotation of the crank 68.

It should now be apparent that the present invention provides a novel free spool mechanism and otherwise accomplishes the objects of the invention.

We claim:

1. A free spool mechanism for a fishing reel having a housing, a line spool rotatably mounted in the housing, a crank also rotatably mounted in the housing, motion-transmitting means interconnecting said crank and line spool, said crank, motion-transmitting means and spool comprising a drive train of multiple rotatable members, said free spool mechanism comprising, a clutch means interconnecting two of the rotatable members in the drive train, said clutch means having interfitting first and second clutch elements, said first clutch element mounted for rotation with one of the rotatable members, said second clutch element mounted for rotation with another of the rotatable members, a throwout cage, means independent of said crank for actuating said throwout cage to disengage said clutch elements and interrupt the driving connection therebetween, a catch means on said throwout cage, trip means operatively mounted for rotation with said crank, at least one finger presented from said trip means for interacting with said catch means in response to rotation of the crank to reengage the clutch elements and resume driving connection between said clutch elements, and yielding means to permit a degree of relative rotation between said finger and said trip means.

2. A free spool mechanism, as set forth in claim 1, in which the clutch elements are opposed and the first clutch element is mounted to be axially slidable with respect to at least one of the rotatable members, said throwout cage being selectively rotatable by said actuating means and having camming means operatively engageable with said first clutch element upon rotation of said cage to engage and shift said first clutch element axially of the one rotatable member and out of engagement with said second clutch element, engagement of said finger with said catch means in response to rotation of the crank effects retrorotation of said cage operatively to disengage the camming means from said first clutch element to permit movement of said first clutch element along the rotatable member and into driving contact with said second clutch element.

3. A free spool mechanism, as set forth in claim 1, in which stop means limit the yielding movement of said finger with respect to the crank through a predetermined range.

4. A free spool mechanism, as set forth in claim 3, in which a yoke supports said first clutch element for rotation with respect thereto, said yoke having at least one positioning wing, said positioning wing being embraced by the housing simultaneously to preclude rotation and permit translation thereof, at least one camming surface on said throwout cage, said camming surface selectively engaging said positioning wing to separate said clutch elements.

5. A free spool mechanism, as set forth in claim 4, in which said camming surface has an apex, engagement of said apex with said positioning wing maintaining said first clutch element separated from said secon dclutch element.

6. A free spool mechanism, as set forth in claim 5, in which the crank is secured to a drive shaft rotatably mounted in said housing to comprise one element of the motion-transmitting means and in which the trip means has a barrel portion mounted on said drive shaft for rotation therewith, a trip plate mounted on said barrel portion for limited rotation with respect thereto, said finger extending outwardly of said trip plate.

7. A free spool mechanism, as set forth in claim 6, in which a limit plate is nonrotatably secured to said barrel portion and presents a limit flange, a stop shoulder and lug presented from said trip plate for engagement with said limit flange to determine the range through which said trip plate can rotate with respect to said barrel portion.

8. A free spool mechanism, as set forth in claim 7, in which a spring means normally biases said stop lug against said limit flange and in which said stop shoulder is normally spaced therefrom to permit limited rotation of the trip plate upon contact of said finger with the catch means on said throwout cage.

9. A free-spooling reel comprising, a headplate, a tail assembly rigidly secured in spaced relation to said headplate, an arbor supported in said tail assembly and through said headplate, a line spool rotatably mounted on said arbor between the headplate and tail assembly, a drive shaft rotatably mounted on said arbor exteriorly of said headplate, crank means selectively to rotate said drive shaft, a traversing shaft in spaced relation with said spool, said traversing shaft journaled in and extending between said headplate and tail assembly, first gear means operatively connecting said traversing shaft to said line spool, a rotating member journaled on said headplate and about said traversing shaft, second gear means operatively connecting said drive shaft to said rotating member, a first clutch element secured to said rotating member, a second clutch element mounted on said traversing shaft to rotate therewith and slide axially thereof, a throwout cage to separate said clutch elements and disengage the driving connection therebetween, trip means being actuated in response to rotation of the crank to reengage the driving connection between said clutch elements.

10. A free-spooling reel, as set forth in claim 9, in which said throwout cage is selectively rotatable, camming means on said throwout cage for separating said clutch elements upon rotation of said cage, said trip means comprising a barrel portion mounted on said drive shaft to be nonrotatable with respect thereto, finger means, yielding means mounting said finger means on said barrel portion for rotation through a predetermined range with respect to said barrel portion, said finger means effecting retrorotation of said cage upon rotation of said drive shaft to permit reengagement of said clutch elements.